US011256304B2

(12) United States Patent
Mehandjiysky et al.

(10) Patent No.: US 11,256,304 B2
(45) Date of Patent: Feb. 22, 2022

(54) SUSPENSIONS FOR DISPLAYS

(71) Applicant: Hewlett-Packard Development Company, L.P., Spring, TX (US)

(72) Inventors: Dimitre D. Mehandjiysky, Spring, TX (US); Busarin Chumnong, Houston, TX (US); Syed S. Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/043,023

(22) PCT Filed: Aug. 31, 2018

(86) PCT No.: PCT/US2018/049236
§ 371 (c)(1),
(2) Date: Sep. 29, 2020

(87) PCT Pub. No.: WO2020/046390
PCT Pub. Date: Mar. 5, 2020

(65) Prior Publication Data
US 2021/0181807 A1    Jun. 17, 2021

(51) Int. Cl.
*G06F 1/16*    (2006.01)
(52) U.S. Cl.
CPC .......... *G06F 1/1681* (2013.01); *G06F 1/1652* (2013.01)
(58) Field of Classification Search
CPC .... G06F 1/1681; G06F 1/1652; G06F 1/1616; G02F 1/133305; H04M 1/0216; H04M 1/0268
See application file for complete search history.

(56) References Cited

U.S. PATENT DOCUMENTS

| | | | |
|---|---|---|---|
| 8,228,667 B2 | 7/2012 | Ma | |
| 8,363,393 B2 | 1/2013 | Bemelmans | |
| 8,385,055 B2 | 2/2013 | Kao et al. | |
| 8,787,016 B2 * | 7/2014 | Rothkopf | G06F 1/1681 |
| | | | 361/679.55 |
| 8,908,365 B2 | 12/2014 | Walters et al. | |
| 9,119,316 B2 | 8/2015 | Lee | |
| 9,557,771 B2 * | 1/2017 | Park | G06F 1/1681 |
| 9,760,126 B2 * | 9/2017 | Shin | G06F 1/1652 |

(Continued)

FOREIGN PATENT DOCUMENTS

| | | |
|---|---|---|
| CN | 205657718 U | 10/2016 |
| CN | 107135288 A | 9/2017 |
| TW | 201417068 A | 5/2014 |

*Primary Examiner* — Hung S. Bui
*Assistant Examiner* — Sagar Shrestha
(74) *Attorney, Agent, or Firm* — Conley Rose, P.C.

(57) ABSTRACT

Example computing devices are disclosed that include a first housing member rotatably coupled to a second housing member at a hinge. In addition, the computing devices include a display including first and second ends disposed on first and second sides of the hinge, respectively. Further, the computing devices include a suspension including an elongate member coupled to the hinge and the first end of the display. The second housing member is to rotate about an axis of the hinge relative to the first housing member to actuate the elongate member relative to the hinge, and the elongate member is to actuate relative to the hinge to translate the first end of the display relative to the first housing member.

13 Claims, 7 Drawing Sheets

(56) References Cited

U.S. PATENT DOCUMENTS

| | | |
|---|---|---|
| 9,934,706 B2 | 4/2018 | Lim |
| 9,980,373 B2 * | 5/2018 | Jeong .................. H05K 5/0017 |
| 10,268,244 B2 * | 4/2019 | Lin ....................... G06F 1/1616 |
| 10,761,573 B2 * | 9/2020 | Hsu ....................... G06F 1/1681 |
| 2011/0102976 A1 | 5/2011 | Chen |
| 2011/0286157 A1 * | 11/2011 | Ma ........................ G06F 1/1652 |
| | | 361/679.01 |
| 2012/0002360 A1 * | 1/2012 | Seo ....................... G06F 1/1652 |
| | | 361/679.01 |
| 2013/0021762 A1 * | 1/2013 | van Dijk .............. H04M 1/022 |
| | | 361/749 |
| 2013/0314611 A1 | 11/2013 | Okutsu et al. |
| 2014/0111954 A1 | 4/2014 | Lee et al. |
| 2014/0218321 A1 | 8/2014 | Lee et al. |
| 2014/0355195 A1 * | 12/2014 | Kee ....................... G06F 1/1641 |
| | | 361/679.27 |
| 2015/0241925 A1 * | 8/2015 | Seo ....................... G06F 1/1681 |
| | | 361/679.27 |
| 2015/0366089 A1 | 12/2015 | Park et al. |
| 2015/0378397 A1 * | 12/2015 | Park ..................... G06F 1/1652 |
| | | 361/679.27 |
| 2016/0070303 A1 | 3/2016 | Lee et al. |
| 2016/0334836 A1 | 11/2016 | Hong et al. |
| 2017/0115701 A1 * | 4/2017 | Bae .......................... G06F 1/16 |
| 2017/0160769 A1 | 6/2017 | Xu |
| 2017/0264723 A1 * | 9/2017 | Mok .................... H04M 1/0216 |
| 2018/0203487 A1 | 7/2018 | Kee et al. |
| 2019/0179373 A1 * | 6/2019 | Cheng .................... H04M 1/02 |
| 2019/0200470 A1 * | 6/2019 | Woo ......................... H05K 5/03 |
| 2019/0354138 A1 * | 11/2019 | Araki ................... G06F 1/1641 |

* cited by examiner

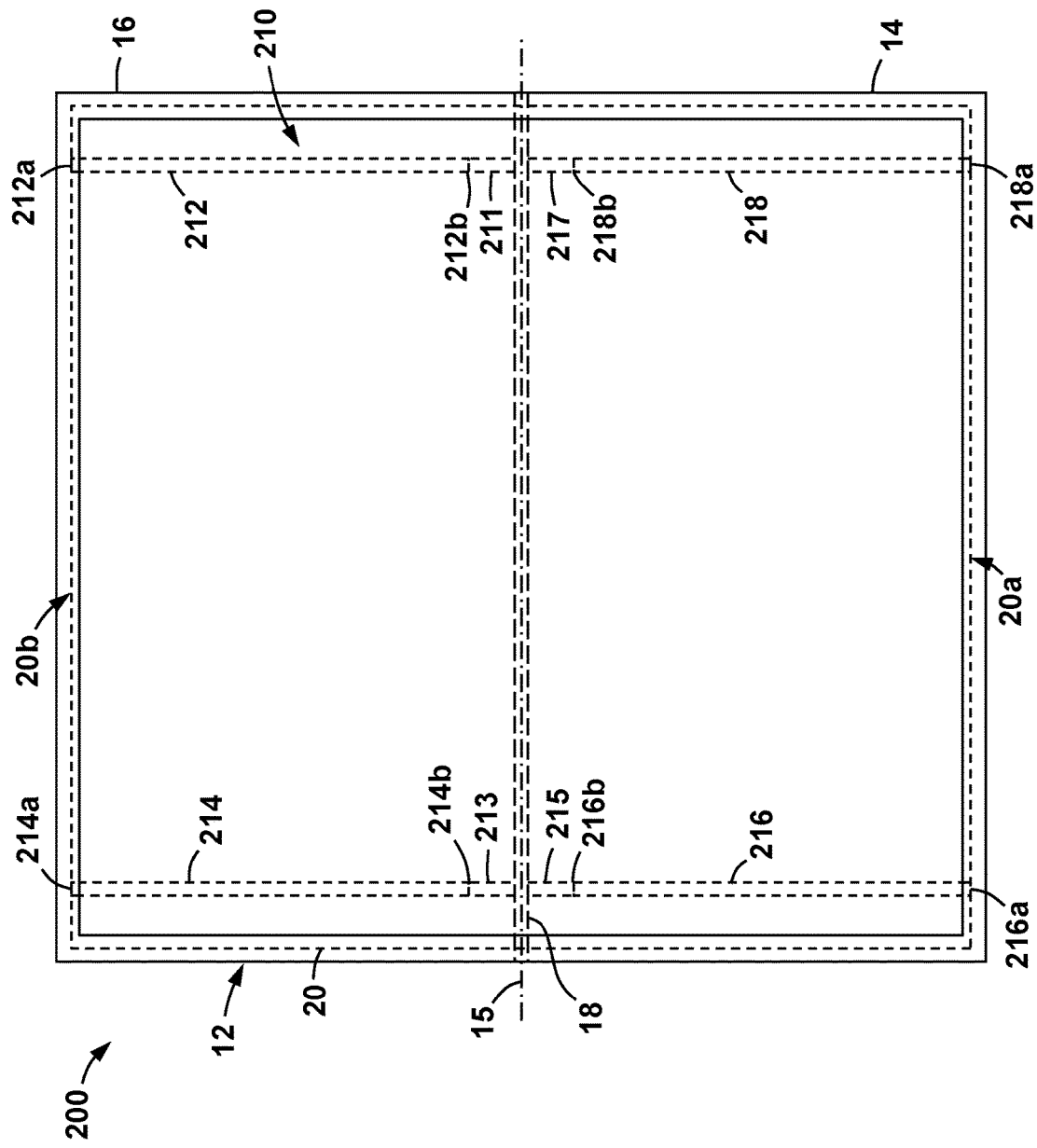

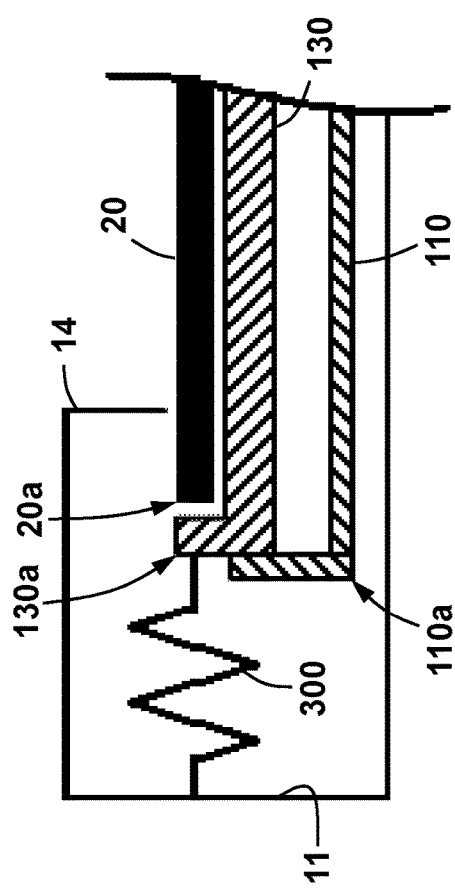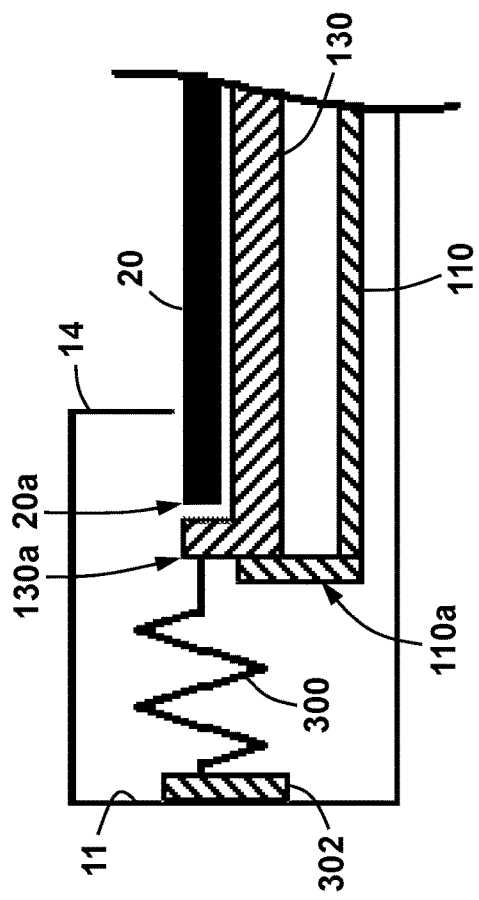

SUSPENSIONS FOR DISPLAYS

BACKGROUND

Computing devices may incorporate flexible displays that can be deformed (e.g., rolled, folded, etc.) without losing electric functionality and connectivity. Typically, such flexible displays may be deformed to a minimum radius of curvature before the display sustains damage.

BRIEF DESCRIPTION OF THE DRAWINGS

Various examples will be described below referring to the following figures:

FIG. 6 is a top, partial schematic view of another computing device including a flexible display and an associated suspension according to some examples;

FIG. 7 is an enlarged, schematic, partial cross-sectional view of another computing device including a flexible display and an associated suspension according to some examples;

FIG. 8 is an enlarged, schematic, partial cross-sectional view of another computing device including a flexible display and an associated suspension according to some examples;

DETAILED DESCRIPTION

Figure 1:
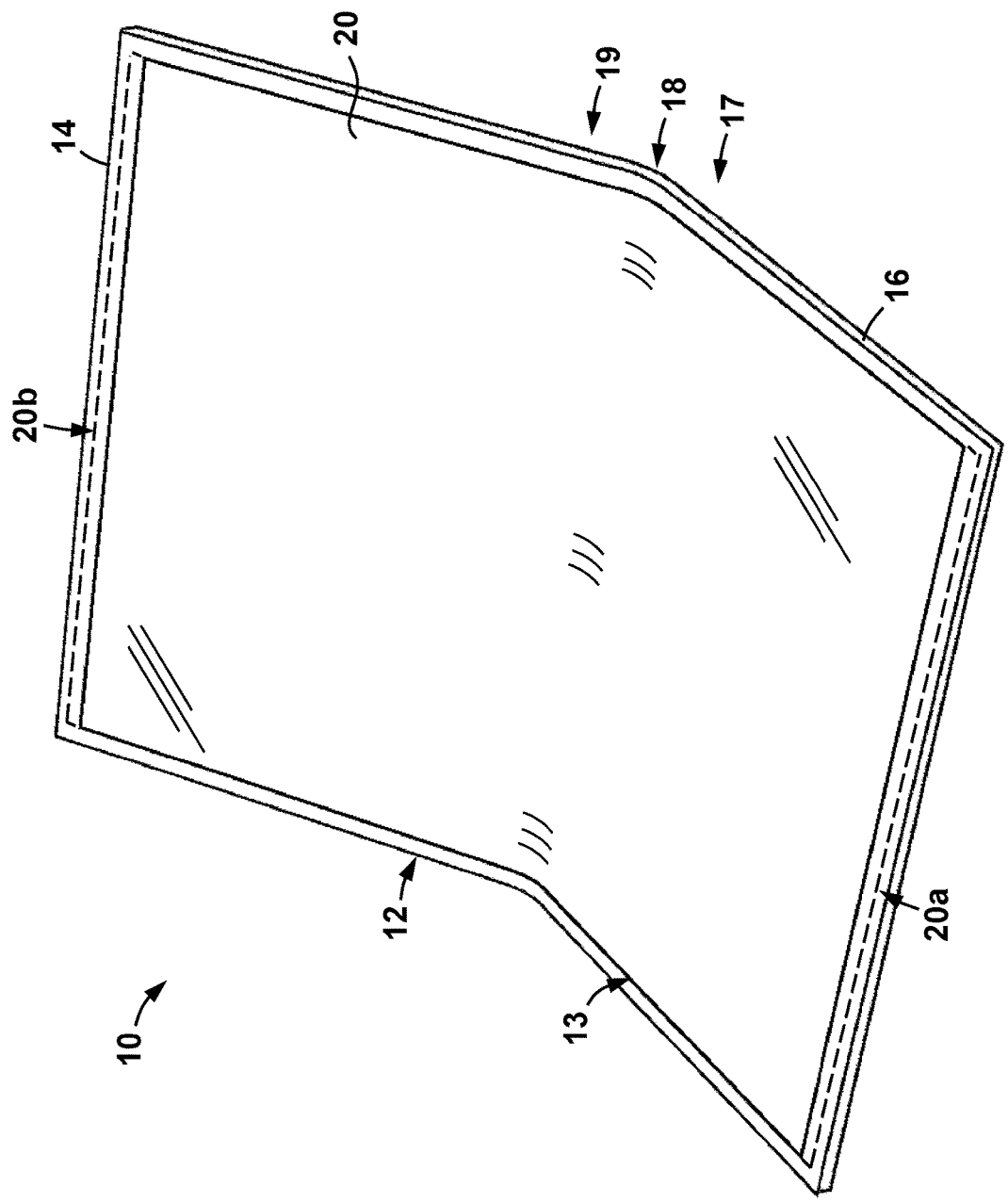
FIG. 1 is a perspective view of a computing device including a flexible display and an associated suspension according to some examples.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, including in the claims, the word "or" is used in an inclusive manner. For example, "A or B" means any of the following: "A" alone, "B" alone, or both "A" and "B." In addition, when used herein (including the claims) the words "generally," "about," "approximately," or "substantially" mean within a range of plus or minus 20% of the stated value. As used herein, the term "display" refers to an electronic display (e.g., a liquid crystal display (LCD), a plasma display, etc.) that is to display images generated by an associated computing device. The term "flexible display" refers to an electronic display that may be deformed (e.g., rolled, folded, etc.) within a given parameter or specification (e.g., a minimum radius of curvature) without losing electrical function or connectivity. As used herein, the term "computing device," refers to an electronic device that is to carry out machine readable instructions, and may include internal components, such as, processors, power sources, memory devices, etc. For example, a computing device may include, among other things, a personal computer, a smart phone, a tablet computer, a laptop computer, a personal data assistant, etc.

As previously described, computing devices may incorporate a flexible display. Often such computing devices are transitionable between open and closed positions (e.g., such as is the case for a laptop style computing device) to facilitate transport and storage of the device when not in use. When the computing device is placed in the closed (often folded) position, the flexible display may be rolled or deformed. While the flexible display is generally capable of such a deformation, there are typically limits to the deformation such a display may experience. For example, if the display is deformed excessively (such as when the associated computing device is transitioned into a closed position), the display may be damaged. Accordingly, examples disclosed herein include computing devices utilizing flexible displays that employ suspensions therein for facilitating an acceptable and controlled deformation of the flexible display as the computing device is transitioned between open and closed positions.

Referring now to FIG. 1, a computing device 10 according to some examples disclosed herein is shown. Computing device 10 includes a housing 12 and a flexible display 20 partially disposed within the housing 12.

Housing 12 includes a first housing member 14 and a second housing member 16. The first and second housing members 14, 16 are rotatably coupled to one another at a hinge 18. Thus, first housing member 14 may rotate about the hinge 18 relative to second housing member 16, and second housing member 16 may rotate about hinge 18 relative to first housing member 14.

Flexible display 20 (or more simply "display 20") is disposed within housing 12, but is accessible for viewing and interaction by a user through an opening 13 formed by the first housing member 14 and second housing member 16. Display 20 includes a first end 20a, and a second end 20b opposite first end 20a. First end 20a of display 20 is disposed on a first side 17 of hinge 18 within first housing member 14, and second end 20b of display 20 is disposed on a second, opposite side 19 of hinge 18 within second housing member 16.

Generally speaking, display 20 is to display images for viewing by the user based on machine readable instructions carried out by electronic components (e.g., processor(s)) (not shown) within computing device 10. In this example, display 20 is a touch sensitive display that is to communicate with other electronic components (not shown) within computing device 10 to detect touch inputs by a user on display 20 during operations. In other examples, display 20 may not be touch sensitive. Display 20 may utilize any suitable display technology such as, for example, LCD, plasma, light emitting diode (LED)-LCD, organic-LED-LCD, etc.

In addition, as previously described, display 20 is a flexible display, and thus, display 20 may be deformed, rolled, etc., within acceptable parameters or specifications while maintaining electrical function and connectivity with other components (not shown) within computing device 10. Thus, when first housing member 14 and second housing member 16 are rotated about hinge 18 relative to one another as previously described above, display 20 is to deform (e.g., roll or bend) proximate to hinge 18 in order to accommodate the relative rotation between the housing members 14, 16.

Figure 2:
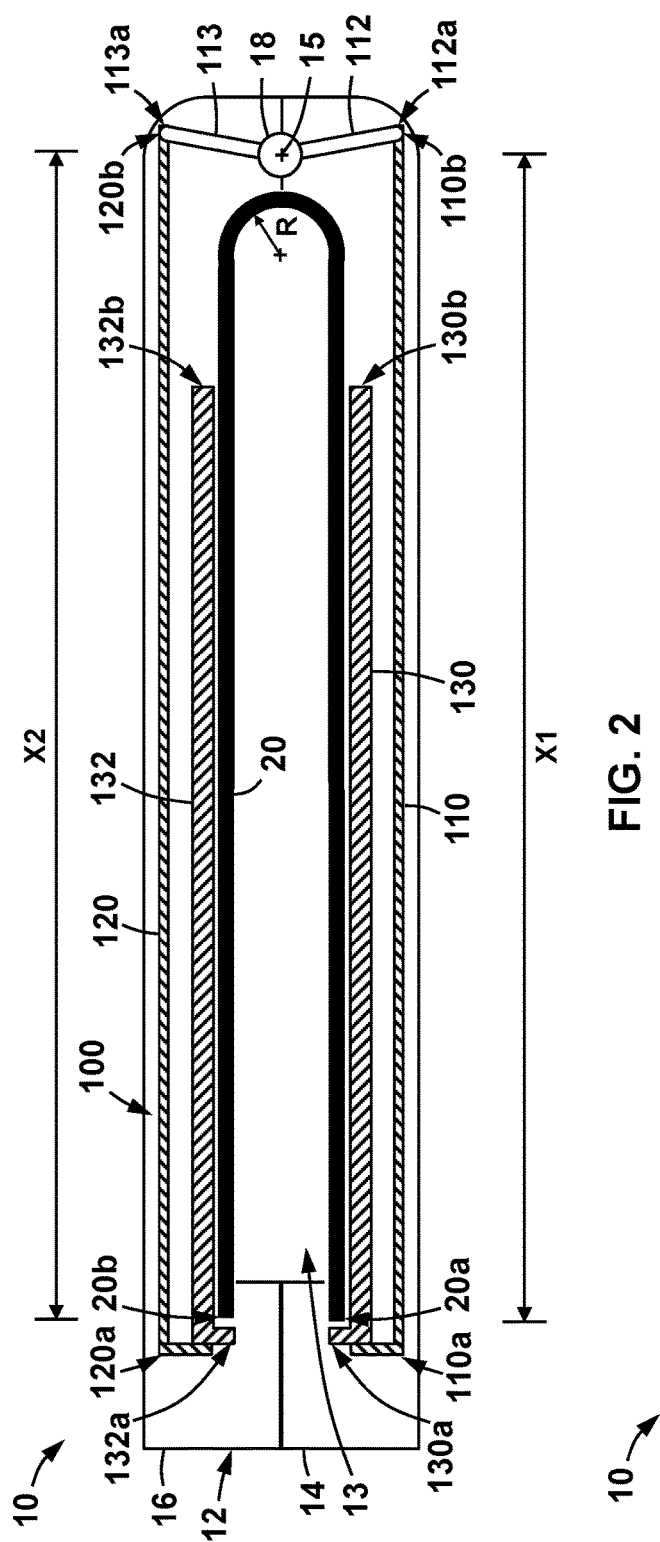
FIG. 2 is an example schematic, partial cross-sectional view of the computing device of FIG. 1, with the housing of the computing device in a closed position.
Figure 3:
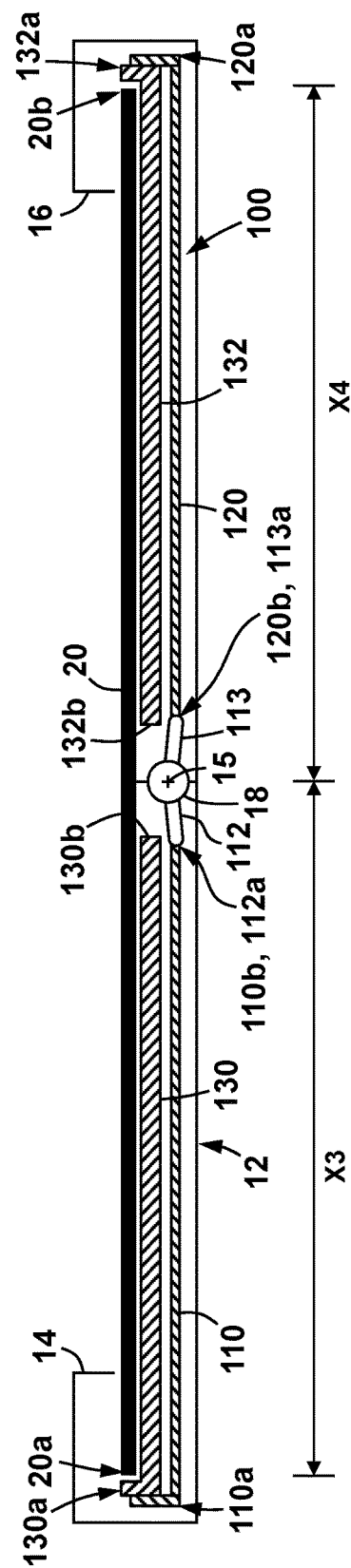
FIG. 3 is an example schematic, partial cross-sectional view of the computing device of FIG. 1, with the housing of the computing device in an open position.

Referring now to FIGS. 2 and 3, housing 12 of computing device 10 may be transitioned between a closed position (or folded position) as shown in FIG. 2, and an open position as shown in FIG. 3. In the closed position (see FIG. 2), the second housing member 16 is rotated about an axis of rotation corresponding to axis 15 of hinge 18, toward first housing member 14 until housing members 14, 16 are in contact with one another and display 20 is concealed by housing members 14, 16. In some examples, the closed position is useful for when a user is transporting the computing device 10 from one location to another or for when the computing device 10 is being stored within a bag or other compartment. In the open position (see FIG. 3), the second housing member 16 is rotated about axis 15 away from first housing member 14, to thereby expose display 20. In some examples, the open position may be useful for operation of the computing device 10 by a user. It should be appreciated that a user may also operate the computing device 10 when it is in a position between the closed position of FIG. 2 and the open position of FIG. 3 (e.g., when the angle between the housing members 14, 16 is greater than 0° but less than 180°).

When the computing device 10 is in the closed position (see FIG. 2), display 20 is deformed proximate to hinge 18 (note: in some examples, display 20 may be fixed to hinge 18 or a portion or component thereof). As previously described above, because display 20 is flexible, display 20 may generally deform without sustaining damage. However, the flexibility of display 20 has limits, such as, for example, a minimum radius of curvature, and it is typically desirable to maintain any deformation of display 20 within those limits to avoid damage thereto during operations. In particular, when housing 12 is transitioned to the closed position of FIG. 2, display 20 is deformed or rolled at or proximate to hinge 18 to a desired radius of curvature R. The radius R may be greater than 0 mm and less than or equal to 5 mm in some examples; however, it should be appreciated that the value of R may be greater than 5 mm in other examples (and thus radius may be referred to herein as a "non-zero radius"). In some examples, the radius R is set or determined by the minimum radius of curvature that display 20 may occupy without sustaining damage or losing electrical function or connectivity.

Thus, computing device 10 includes a suspension 100 to facilitate the deformation of display during the transition of housing 12 between the open and closed positions, so as to avoid damaging display 20 due to an excess deformation thereof. In addition, suspension 100 also provides support to display 20 when housing 12 is in the closed position of FIG. 2, the open position of FIG. 3, or therebetween. In particular, for display 20 to form and accommodate the desired radius R of display 20 when housing 12 is transitioned toward or to the closed position in FIG. 2, ends 20*a*, 20*b* translate or move along housing members 14, 16, respectively, toward hinge 18 (or toward axis 15 of hinge 18). Therefore, suspension 100 generally includes a plurality of elongate members 110, 120, and a plurality of display support members 130, 132, that are to synchronously transfer force to ends 20*a*, 20*b* of display 20 as the first and second housing members 14, 16 are rotated relative to one another. Accordingly, suspension 100 may cause display 20 to uniformly and evenly deform within desired limits as the housing 12 is transitioned between the closed and open positions. The components and function of suspension 100 will now be described in more detail below.

Referring still to FIGS. 2 and 3, display support members 130, 132 are coupled to display 20 and are to provide support to display 20 during operations. For example, support members 130, 132 may facilitate the touch sensitivity of display 20 (for implementations in which display 20 is a touch sensitive display) by providing a rigid backing to display (so that a user's touch event may be properly registered by display 20 during use). In addition, support members 130, 132 may also distribute loads transferred from other components within computing device 10 (e.g., elongate members 110, 120) over a relatively large surface area of display 20, so that damage or wear to display 20 is reduced or minimized.

In this example, first display support member 130 is disposed within first housing member 14, and second display support member 132 is disposed within second housing member 16. First display support member 130 includes a first end 130*a* that is proximate first end 20*a* of display 20 and a second end 130*b* that is more proximate hinge 18 than first end 130*a*. Similarly, second display support member 132 includes a first end 132*a* that is proximate second end 20*b* of display 20 and a second end 132*b* that is more proximate hinge 18 than first end 132*a*.

First elongate member 110 includes a first end 110*a* and a second end 110*b* opposite first end 110*a*. First end 110*a* is coupled to first end 130*a* of first display support member 130 (and thus, first end 110*a* is also coupled to first end 20*a* of display 20), and second end 110*b* is coupled to hinge 18 through a linking arm 112 that is coupled to hinge 18. Similarly, second elongate member 120 includes a first end 120*a* and a second end 120*b* opposite first end 120*a*. First end 120*a* is coupled to first end 132*a* of second display support member 132 (and thus, first end 120*a* is coupled to second end 20*b* of display 20), and second end 120*b* is coupled to hinge 18 through a linking arm 113 that is coupled to hinge 18.

The linking arms 112, 113 extend outward from axis 15 of hinge 18. In some examples, linking arms 112, 113 extend radially (or perpendicularly) outward from axis 15; however, in other examples, linking arms 112, 113 may be curved or angled such that they do not extend radially with respect to axis 15. The linking arms 112, 113 are coupled to hinge 18 such that as housing members 14, 16 are rotated relative to one another about hinge 18, distal ends 112*a*, 113*a* of each linking arm 112, 113, respectively, is also rotated about hinge 18 (or more particularly about axis 15 of hinge 18).

As previously described, second ends 110*b*, 120*b* of elongate members 110, 120, respectively, are coupled to linking arms 112, 113, respectively. In particular, second ends 110b, 120b are pivotably coupled (e.g., via a pinned connection or the like) to distal ends 112a, 113a, respectively, of linking arms 112, 113, respectively. Thus, as housing 12 is transitioned between the closed position of FIG. 2 and the open position of FIG. 3, elongate members 110, 120 are translated toward or away from hinge 18 along the respective housing members 14, 16 due to the pivotable coupling between second ends 110b, 120b of elongate members 110, 120, respectively, and distal ends 112a, 113a of linking arms 112, 113, respectively (see the progression between FIGS. 2 and 3). In particular, as housing 12 is transitioned from the closed position toward the open position, the elongate members 110, 120 are translated (e.g., via linking arms 112, 113) away from hinge 18 (and axis 15). Conversely, as housing 12 is transitioned from the open position toward the closed position, the elongate members 110, 120 are translated (e.g., via linking arms 112, 113) toward hinge 18 (and axis 15). Because first ends 110a, 120a of elongate members 110, 120, respectively, are coupled to ends 20a, 20b, respectively, or display 20 (e.g., via display support members 130, 132, respectively), the translation of elongate members 110, 120 toward and away from hinge 18 (and axis 15) also works to translate or actuate ends 20a, 20b toward and away from hinge 18 (and axis 15) as housing 12 is transitioned between the open and closed positions. Accordingly, suspension 100 (namely elongate members 110, 120 and linking arms 112, 113) operates to move ends 20a, 20b of display 20 relative to hinge 18 and housing members 14, 16 to accommodate radius R when housing 12 is in the closed position (see FIG. 2) and to extend display 20 for viewing and interaction by a user when housing 12 is in the open position (see FIG. 3).

Because the above described motion of elongate members 110, 120 is tied to the motion of housing members 14, 16 about hinge 18 (e.g., via linking arms 112, 113 as previously described), the ultimate motion or movement of ends 20a, 20b of display 20 is synchronized with the movement of housing 12 about hinge 18. Without being limited to this or any other theory, the synchronous movement of ends 20a, 20b during rotation of housing members 14, 16 about hinge 18 may help to facilitate a repeatable, even, and uniform movement of display 20, so that irregular and undesired deformation of display 20 may be avoided.

Referring still to FIGS. 2 and 3, when housing 12 is in the closed position of FIG. 2, first end 20a of display 20 is disposed at a distance X1 from axis 15 of hinge 18 along first housing member 14, and second end 20b of display 20 is disposed at a distance X2 from axis 15 along second housing member 16. When housing 12 is in the open position of FIG. 3, first end 20a of display 20 is disposed at a distance X3 from axis 15 along first housing member 14, and second end 20b of display 20 is disposed at a distance X4 from axis 15 along second housing member 16. In this example, the distances X1, X2, X3, X4 are measured radially from axis 15 of hinge 18 and the ends (e.g., ends 20a, 20b) of display 20. In addition, in this example the distance X1 is less than the distance X3 (i.e., X1<X3), and the distance X2 is less than the distance X4 (i.e., X2<X4). Without being limited to this or any other theory, the difference between distance X1 and distance X3 and the difference between distance X2 and distance X4 is determined by the size of radius R when housing 12 is in the closed position. Thus, for larger values of the radius R, the difference between distances X1 and X3 and between distances X2 and X4 should be larger (since more length of display 20 is taken up to form the larger radius R). Also, in some examples, because the movement of ends 20a, 20b of display 20 are synchronized with one another (and with the movement of housing members 14, 16 about hinge 18) as previously described, the difference between distances X1 and X3 may be equal (or substantially equal) to the difference between distances X2 and X4.

While housing 12 of computing device 10 has been shown in a fully closed position (see FIG. 2) and a fully open position (e.g., FIG. 3), it should be appreciated that housing 12 may occupy a number of other positions in other examples. For instance, referring to FIG. 4, an example of computing device 10 is shown in a position that is between the open position of FIG. 3 and the closed position of FIG. 2.

Figure 4:
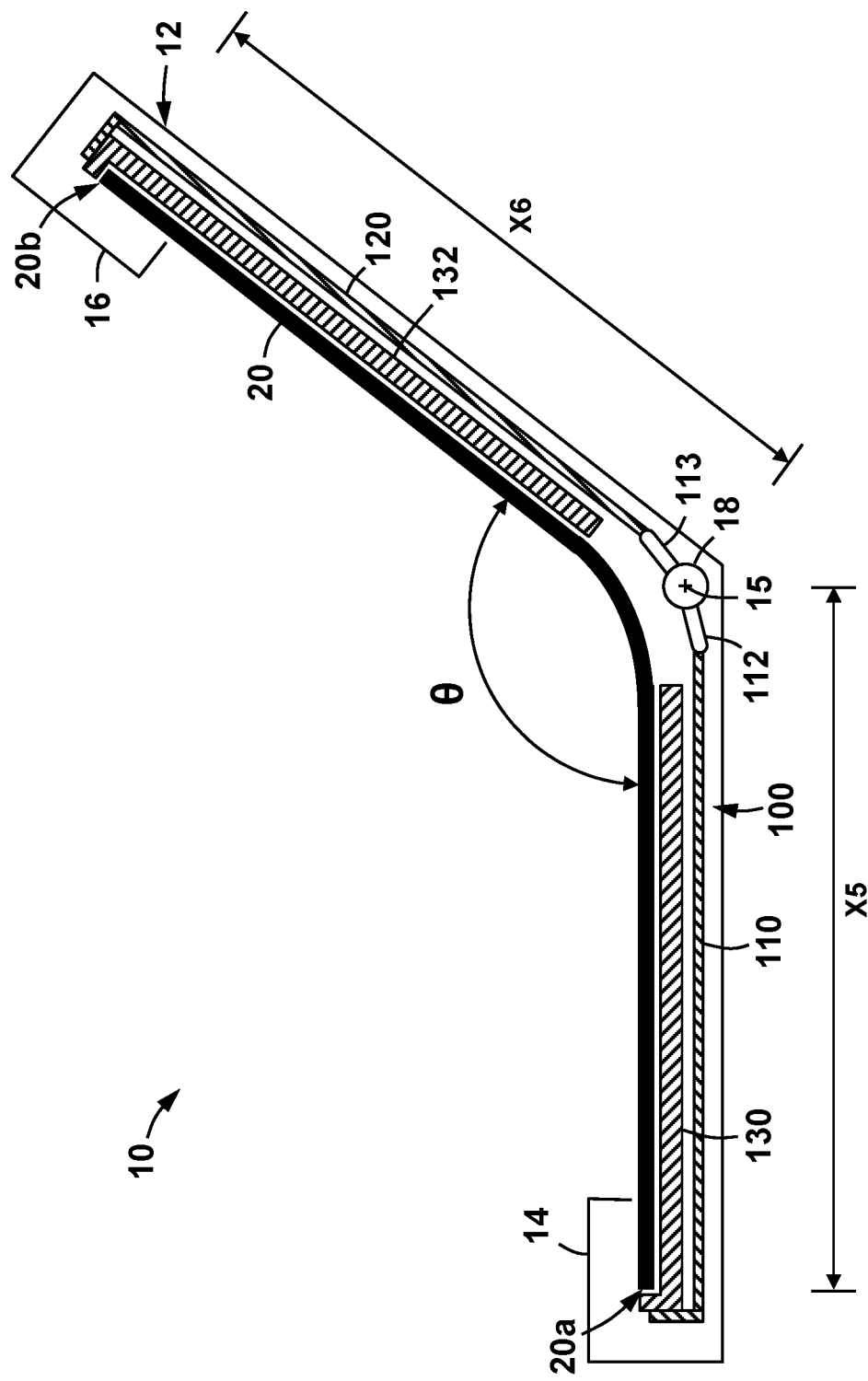
FIG. 4 is an example schematic, partial cross-sectional view of the computing device of FIG. 1, with the housing of the computing device in a position between the closed position of FIG. 2 and the open position of FIG. 3.

In particular, when housing 12 is in the position of FIG. 4, the first housing member 14 and second housing member 16 extend at an angle θ to one another that ranges between 0° and 180° (e.g., 0°<θ<180°), such as, for example, between 90° and 180° (e.g., 90°≤θ<180°). Thus, the relative positioning of housing members 14 and 16 is between that of the closed position (see FIG. 2, where the angle θ would equal about 0°) and the open position (see FIG. 3, where the angle θ would equal about 180°). As a result, the rotational positions of linking arms 112, 113 about hinge 18 and the translational positions of elongate members 110, 120 relative to hinge 18 is between the relative positions of these components when housing 12 is in the closed and open positions. Therefore, due to the relative movement of elongate members 110, 120 and linking arms 112, 113 of suspension 100, the ends 20a, 20b of display 20 are also moved to positions that are between the positions of ends 20a, 20b while housing 12 is in the closed position of FIG. 2 and the open position of FIG. 3.

More particularly, when housing 12 is in the position of FIG. 4, first end 20a of display is disposed at a distance X5 from axis 15 of hinge 18 along first housing member 14, and second end 20b of display 20 is disposed at a distance X6 from axis 15 of hinge 18 along second housing member 16. As with distances X1-X4 in FIGS. 2 and 3, the distances X5 and X6 are measured in a radial direction from axis 15. In this example, the distance X5 is less than the distance X3 (see FIG. 3) but is greater than the distance X1 (see FIG. 2) (i.e., X3>X5>X1). Similarly, in this example, the distance X6 is less than the distance X4 (see FIG. 3) but is greater than the distance X2 (see FIG. 2) (i.e., X4>X6>X2). Thus, it should be appreciated that suspension 100 (namely elongate members 110, 120 and linking arms 112, 113) facilitate the relative, synchronous movement of ends 20a, 20b of display 20 while housing 12 is in the closed position of FIG. 2, the open position of FIG. 3, and when housing 12 is in a position between the closed and open positions (e.g., see FIG. 4).

In still other examples, first and second housing members 14 and 16, respectively, may be further rotated relative to one another such that housing 12 is in a "tent" type position, with first housing member 14 and second housing member 16 extending from hinge 18 at a relative angle greater than 180°. For instance, referring now to FIG. 5, an example of computing device 10 is shown where housing members 14, 16 are rotated about the hinge 18 such that the angle θ therebetween is greater than 180°, such as, for example, between 180° and 270° (e.g., 180°<θ≤270°). In this position, once housing members 14, 16 are rotated past 180° (i.e., past the open position of FIG. 3), the rotational positions of linking arms 112, 113 about hinge 18 and the resulting translational positions of elongate members 110, 120 relative to hinge 18 along housing members 14, 16, respectively, change such that ends 20a, 20b of display 20 begin to move toward hinge 18 (e.g., similarly to the movement of ends 20a, 20b when transitioning housing 12 from the open position of FIG. 3 to the closed position of FIG. 2). Specifically, ends 20a, 20b of display 20 may move toward hinge 18 along housing members 14, 16, respectively, in order to accommodate a roll or deformation 21 of display 20 at or proximate hinge 18 due to the movement of housing members 14, 16 as shown in FIG. 5.

Figure 5:
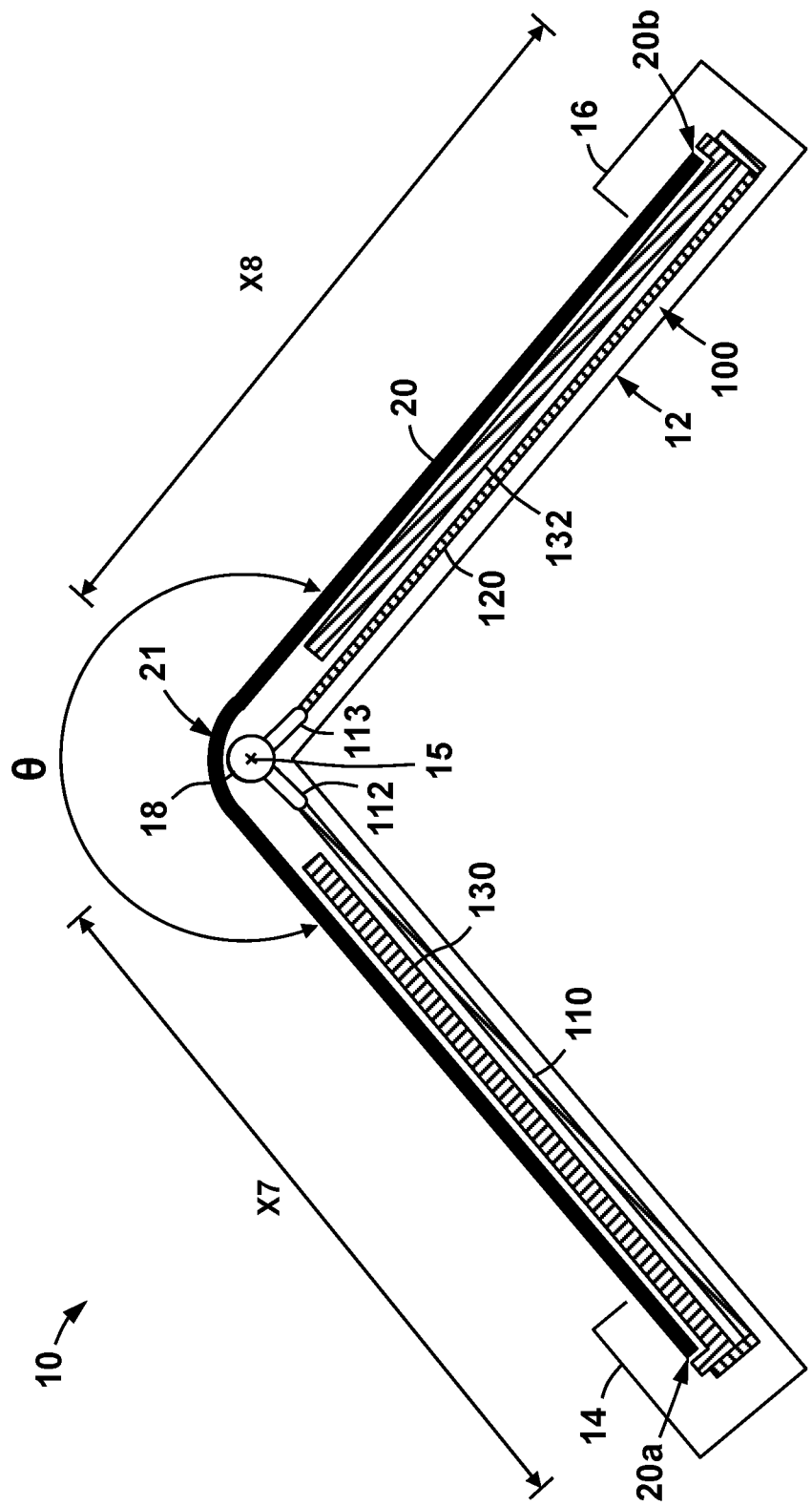
FIG. 5 is a schematic, partial cross-sectional view of an example of the computing device of FIG. 1, with the housing of the computing device in a tent-type position.

More particularly, when housing 12 is in the position of FIG. 5, first end 20a of display 20 is disposed at a distance X7 from axis 15 along first housing member 14, and second end 20b of display 20 is disposed at a distance X8 from axis 15 along second housing member 16. As with distances X1-X6 in FIGS. 2-4, the distances X7 and X8 are measured in a radial direction from axis 15. In addition, in this example the distance X7 is less than the distance X3 (i.e., X7<X3), and the distance X8 is less than the distance X4 (i.e., X8<X4). Thus, as with the positions of housing 12 in the examples of FIGS. 2-4, it should be appreciated that suspension 100 (namely elongate members 110, 120 and linking arms 112, 113) facilitate the relative, synchronous movement of ends 20a, 20b of display 20 while housing members 14, 16 are rotated past 180° relative to one another about hinge 18.

While the examples of FIGS. 2-5 specifically depicted a single elongate member and linking arm within the housing members 14, 16, it should be appreciated that other examples of computing device 10 may include a suspension employing a plurality of elongate members and linking arms within the housing members 14, 16. For instance, referring now to FIG. 6 where another example computing device 200 is shown. Computing device 200 is generally the same as computing device 10 previously described, and thus, like components between computing devices 10, 200 are identified with like reference numerals and the description below will focus on the differences between computing devices 10, 200.

In particular, computing device 200 includes housing 12 and flexible display 20, which are the same as previously described above. In addition, computing device 200 includes a suspension 210 in place of suspension 100, previously described (see FIGS. 2-5). Specifically, suspension 210 includes a total of four elongate members 212, 214, 216, 218 in place of elongate members 110, 120. In this example, elongate members 212, 214 are disposed within second housing member 16, and elongate members 216, 218 are disposed within first housing member 14. In addition, first ends 212a, 214a of elongate members 212, 214, respectively, are coupled to second end 20b of flexible display 20, and second ends 212b, 214b of elongate members 212, 214, respectively, are pivotably coupled to linking arms 211, 213, respectively. Further, first ends 216a, 218a of elongate members 216, 218, respectively, are coupled to second end 20a of flexible display 20, and second ends 216b, 218b of elongate members 216, 218, respectively, are pivotably coupled to linking arms 215, 217, respectively.

Elongate members 212, 214 are substantially the same as elongate member 110, and elongate members 216, 218 are substantially the same as elongate member 120 (see FIGS. 2-5). In addition, linking arms 211, 213 are substantially the same as linking arm 113, and linking arms 215, 217 are substantially the same as linking arm 112 (see FIGS. 2-5). Accordingly, linking arms 211, 213, 215, 217 are coupled to and extend from hinge 18 in substantially the same manner as described above for linking arms 112, 113 (see FIGS. 2-5).

During operations, as housing 12 is transitioned between the closed position and the open position (see e.g., FIGS. 2 and 3), elongate members 212, 214 translate within housing member 16 toward and away from hinge 18 via linking arms 211, 213 and elongate members 216, 218 translate within housing member 14 toward and way from hinge 18 via linking arms 215, 217, respectively. The movement of elongate members 212, 214 and linking arms 211, 213 is the same as that described above for elongate member 120 and linking arm 113, and the movement of elongate members 216, 218 and linking arms 215, 217 is the same as that described above for elongate member 110 and linking arm 112. Thus, as housing 12 of computing device 200 is transitioned between the open and closed positions as described above in reference to FIGS. 2 and 3 (and beyond the open position as described above in reference to FIG. 5), suspension 210 (namely elongate members 212, 214, 216, 218 and linking arms 211, 213, 215, 217) operates to synchronously move ends 20a, 20b of flexible display 20 relative to hinge 18 and housing members 14, 16 to accommodate radius R when housing 12 is in the closed position (see FIG. 2) and to extend flexible display 20 for viewing and interaction by a user when housing 12 is in the open position (see FIG. 3) or some position therebetween (see e.g., FIG. 4) or beyond the open position (see e.g., FIG. 5).

It should be appreciated that suspension 210 may also include display support members 130, 132 (see FIGS. 2-5), but these components are not shown in FIG. 6 so as not to unduly complicate the figure. However, in some examples, first ends 212a, 214a of elongate members 212, 214, respectively, are coupled to display support member 130 in the same way as described above for elongate member 110, and first ends 216a, 218a of elongate members 216, 218, respectively, are coupled to display support member 132 in the same way as described above for elongate member 120.

Referring now to FIGS. 2, 3, 7, and 8, in some examples (including any of the other examples specifically disclosed herein), biasing members 300 may be disposed within housing 12 to bias ends 20a, 20b of flexible display 20 relative to hinge 18 in order to further facilitate the movement and desired deformation of the flexible display during operations. In particular, in the example of FIG. 7, a biasing member 300 is disposed between first end 130a of display support member 130 and an inner wall 11 of first housing member 14. In this example, biasing member 300 is a coiled spring.

Biasing member 300 is to provide a biasing force to first end 20a of flexible display 20 toward or away from hinge 18, as appropriate. In particular, in this example, biasing member 300 is disposed within first housing member 14 such that biasing member 300 biases first end 20a of flexible display 20 (via display support member 130) toward inner wall 11 when the housing 12 is in the closed position (see FIG. 2), and biases first end 20a of flexible display 20 (via display support member 130) toward hinge 18 when housing 12 is in the open position (see FIG. 3). In some examples, biasing member 300 may be directly coupled to first end 20a of flexible display 20 or may be coupled to first end 110a of elongate member 110 rather than first end 130a of display support member 130 as shown in FIG. 7. However, in these additional examples, the operation and function of biasing member 300 would be the same as that described above.

Referring specifically to FIG. 8, in some examples, biasing member 300 is coupled to a separate chassis or support component within housing member 14 rather than to inner wall 11. In particular, as shown in FIG. 8, biasing member 300 is disposed between a chassis member 302 and a first end 130*a* of display support member 130. However, in this example, the operation and function of biasing member 300 would be the same as that described above for the example of FIG. 7.

Further, while the examples in FIGS. 7 and 8 have specifically depicted biasing member 300 disposed between first end 20*a* of flexible display 20 and inner wall 11 or chassis member 302 within first housing member 14, it should be appreciated that in other examples, another biasing member 300 may be similarly disposed between second end 20*b* of flexible display 20 and an inner wall or chassis member (see e.g., wall 11 and chassis member 302) within second housing member 16.

While examples specifically depicted herein have included computing devices where both ends (e.g., ends 20*a*, 20*b*) of a flexible display (e.g., flexible display 20) are movable relative to a central hinge (e.g., hinge 18) of a housing of the device (e.g., housing 12), in other examples, a single end of the display is movable relative to the hinge. For example, referring now to FIGS. 9 and 10, a computing device 400 is shown. Computing device 400 is generally the same as computing device 10 of FIGS. 1-5, and thus, like components between computing devices 10, 400 are identified with like reference numerals, and the discussion below will focus on the components and features of computing device 400 that are different from computing device 10.

Figure 9:
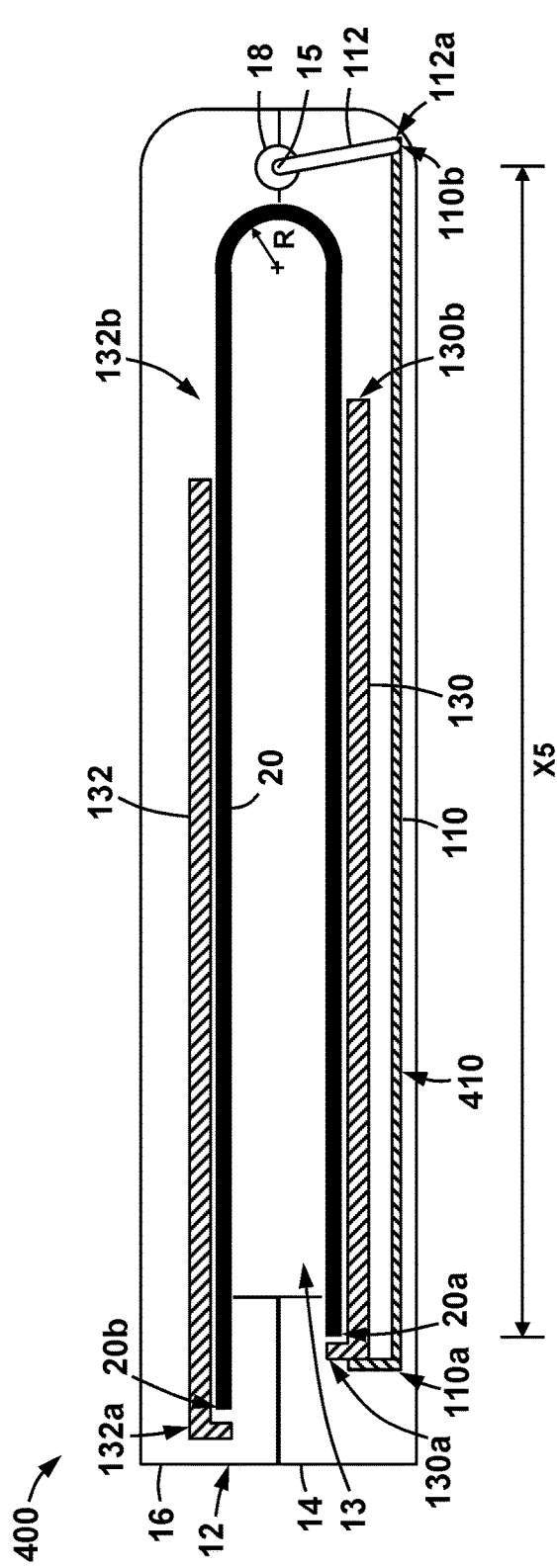
FIG. 9 is a schematic, partial cross-sectional view of the computing device including a flexible display and an associated suspension, with the housing of the computing device in a closed position according to some examples.
Figure 10:
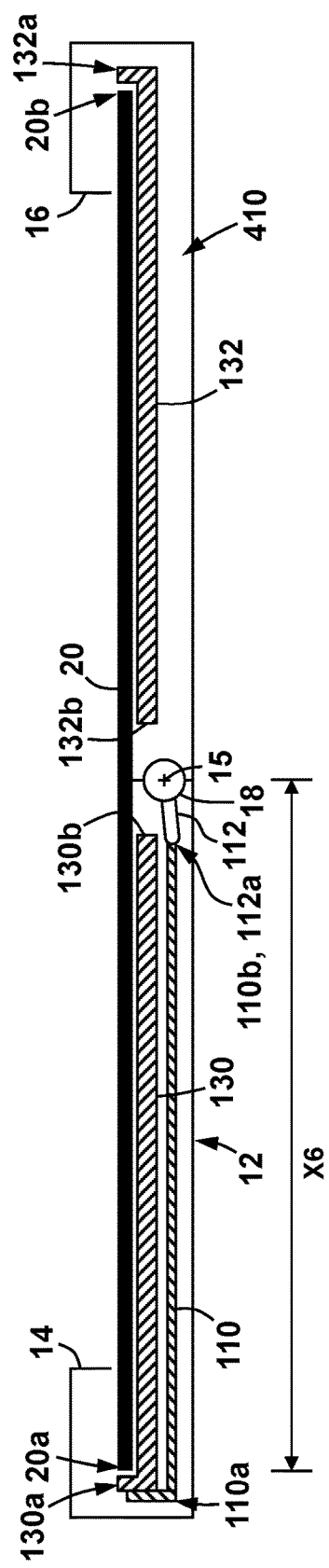
FIG. 10 is an example schematic, partial cross-sectional view of the computing device of FIG. 9, with the housing of the computing device in an open position.

As shown in FIGS. 9 and 10, in this example, computing device 400 includes housing 12, flexible display 20, and display support members 130, 132, each being the same as previously described above for computing device 10. In addition, computing device 400 includes a suspension 410 in place of suspension 100. FIG. 9 shows housing 12 of computing device 400 in a closed position and FIG. 10 shows housing 12 of computing device 400 in an open position.

In this example, second end 20*b* of flexible display 20 is fixed to second housing member 16 via second display support member 132, and thus, suspension 410 facilitates the movement of first end 20*a* of flexible display 20 relative to hinge 18. In particular, suspension 410 includes elongate member 110 and linking arm 112, wherein each is the same as previously described above for computing device 10 (see FIGS. 2 and 3). However, because second end 20*b* of flexible display 20 is fixed relative to second housing member 16 via display support member 132, elongate member 120 and linking arm 113 are omitted from suspension 410.

During operations, as the housing 12 is transitioned between the closed position (see FIG. 9) and the open position (see FIG. 10), second end 20*b* of flexible display 20 remains fixed relative to hinge 18 and second housing member 16; however, first end 20*a* translates within first housing member 14 relative to hinge 18 via elongate member 110 and linking arm 112 in the same manner as described above for computing device 10. Accordingly, a detailed description of this operation is omitted herein in the interest of brevity. Thus, through use of suspension 410, the desired deformation of flexible display 20 is achieved by moving first end 20*a* of flexible display 20 synchronously with the movement of housing members 14, 16 about hinge 18.

Examples disclosed herein have included computing devices utilizing flexible displays that employ suspensions therein for facilitating an acceptable and controlled deformation of the flexible display as the computing device is transitioned between open and closed positions. Accordingly, through use of the example suspensions disclosed herein (and disclosed computing devices including such a suspension), damage and wear to a flexible display caused by the transitioning of the computing device between a closed (or folded) position and an open position may be reduced or eliminated.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A computing device, comprising:
a hinge having a first side and a second side opposite the first side;
a housing comprising a first housing member and a second housing member rotatably coupled to the first housing member at the hinge;
a display coupled to the housing, wherein the display comprises a first end disposed on the first side and a second end disposed on the second side;
a suspension disposed within the housing, wherein the suspension comprises an elongate member comprising a first end and a second end, wherein the first end of the elongate member is coupled to the hinge, and wherein the second end of the elongate member is coupled to the first end of the display; and
a support member coupled to a portion of the display;
wherein the second housing member is to rotate about an axis of the hinge relative to the first housing member, wherein the rotation is to actuate the elongate member relative to the hinge to translate the first end of the display and the support member relative to the first housing member.

2. The computing device of claim 1, comprising a biasing member coupled between the first housing member and the first end of the display.

3. The computing device of claim 2, wherein the biasing member is coupled between a chassis within the first housing member and the first end of the display.

4. The computing device of claim 2, wherein the biasing member comprises a coiled spring.

5. The computing device of claim 1, wherein the second housing member is to rotate about the axis relative to the first housing member to transition the housing member between:
a closed position in which the first end of the display is disposed at a first distance from the axis along the first housing member; and
an open position in which the first end of the display is disposed at a second distance from the axis along the first housing member;
wherein the first distance is less than the second distance.

6. The computing device of claim 1, wherein the first end of the elongate member is coupled to the hinge through a linking arm.

7. A computing device, comprising:
a hinge having a first side and a second side opposite the first side;
a housing comprising a first housing member and a second housing member rotatably coupled to the first housing member at the hinge;
a flexible display coupled to the housing, wherein the flexible display comprises a first end disposed on the first side and a second end disposed on the second side; and
a suspension disposed within the housing, wherein the suspension comprises:

a first elongate member comprising a first end and a second end, wherein the first end of the first elongate member is coupled to the hinge, and wherein the second end of the first elongate member is coupled to the first end of the flexible display; and a second elongate member comprising a first end and a second end, wherein the first end of the second elongate member is coupled to the hinge, and wherein the second end of the second elongate member is coupled to the second end of the flexible display;

wherein the second housing member is to rotate about an axis of the hinge relative to the first housing member, wherein the rotation is to actuate the first elongate member and the second elongate member relative to the hinge to translate the first end of the flexible display relative to the first housing member and to translate the second end of the flexible display relative to the second housing member; and wherein the second housing member is to rotate about the axis relative to the first housing member to transition the housing between:

a closed position in which:
the first end of the display is disposed at a first distance from the axis along the first housing member; and
the second end of the display is disposed at a second distance from the axis along the second housing member; and an open position in which:
the first end of the display is disposed at a third distance from the axis along the first housing member; and
the second end of the display is disposed at a fourth distance from the axis along the second housing member;

wherein first distance is less than the third distance; and
wherein the second distance is less than the fourth distance.

8. The computing device of claim 7, comprising:
a first support member coupled to a first portion of the flexible display; and
a second support member coupled to a second portion of the flexible display;
wherein the rotation is to actuate the first elongate member relative to the hinge to translate the first support member relative to the first housing member; and
wherein the rotation is to actuate the second elongate member relative to the hinge to translate the second support member relative to the second housing member.

9. The computing device of claim 7, comprising:
a first biasing member coupled between the first housing member and the first end of the display; and
a second biasing member coupled between the second housing member and the second end of the display.

10. The computing device of claim 9, wherein the first biasing member and the second biasing member comprise coiled springs.

11. The computing device of claim 7, wherein the first end of the first elongate member is coupled to the hinge through a first linking arm, and wherein the first end of the second elongate member is coupled to the hinge through a second linking arm.

12. A computing device, comprising:
a hinge having a first side and a second side opposite the first side;
a housing comprising a first housing member and a second housing member rotatably coupled to the first housing member at the hinge;
a display coupled to the housing, wherein the display comprises a first end disposed on the first side and a second end disposed on the second side; and
a suspension disposed within the housing, wherein the suspension comprises:
a first elongate member comprising a first end and a second end, wherein the first end of the first elongate member is coupled to the hinge, and wherein the second end of the first elongate member is coupled to the first end of the display; and
a second elongate member comprising a first end and a second end, wherein the first end of the second elongate member is coupled to the hinge, and wherein the second end of the second elongate member is coupled to the second end of the display;

wherein the second housing member is to rotate about the hinge and toward the first housing member to actuate the first elongate member, the first end of the display, the second elongate member, and the second end of the display toward hinge; and wherein the second housing member is to rotate about the hinge and away from the first housing member to actuate the first elongate member, the first end of the display, the second elongate member, and the second end of the display away from the hinge.

13. The computing device of claim 12, comprising:
a first biasing member coupled between the first housing member and the first end of the display; and
a second biasing member coupled between the second housing member and the second end of the display.

* * * * *